(12) United States Patent
Awtar et al.

(10) Patent No.: US 8,540,479 B2
(45) Date of Patent: Sep. 24, 2013

(54) ACTIVE RETRACTABLE SEAL FOR TURBO MACHINERY AND RELATED METHOD

(75) Inventors: Shorya Awtar, Clifton Park, NY (US); Timothy R. Kemp, Greenfield Center, NY (US); Kurt N. Laurer, Saratoga Springs, NY (US); Frederick G. Baily, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 1870 days.

(21) Appl. No.: 11/652,076

(22) Filed: Jan. 11, 2007

(65) Prior Publication Data
US 2008/0169616 A1 Jul. 17, 2008

(51) Int. Cl.
*F04D 29/10* (2006.01)

(52) U.S. Cl.
USPC .......................................... 415/113; 415/231

(58) Field of Classification Search
None
See application file for complete search history.

(56) References Cited

U.S. PATENT DOCUMENTS

| | | |
|---|---|---|
| 4,304,093 A | 12/1981 | Schulze |
| 4,443,311 A | 4/1984 | Lichtin et al. |
| 5,002,288 A | 3/1991 | Morrison et al. |
| 5,395,124 A | 3/1995 | Brandon |
| 5,509,780 A | 4/1996 | Synfelt |
| 5,603,510 A | 2/1997 | Sanders |
| 5,709,388 A | 1/1998 | Skinner et al. |
| 5,749,584 A | 5/1998 | Skinner et al. |
| 5,810,365 A | 9/1998 | Brandon et al. |
| 6,022,027 A * | 2/2000 | Chevrette et al. .............. 277/413 |
| 6,065,754 A | 5/2000 | Cromer et al. |
| 6,131,910 A | 10/2000 | Bagepalli et al. |
| 6,131,911 A | 10/2000 | Cromer et al. |
| 6,139,018 A | 10/2000 | Cromer et al. |
| 6,250,641 B1 | 6/2001 | Dinc et al. |
| 6,257,586 B1 | 7/2001 | Skinner et al. |
| 6,394,459 B1 | 5/2002 | Florin |
| 6,435,513 B2 | 8/2002 | Skinner et al. |
| 6,505,834 B1 | 1/2003 | Dinc et al. |
| 6,651,986 B2 | 11/2003 | Chevrette et al. |
| 6,695,316 B2 | 2/2004 | Popa et al. |
| 6,715,766 B2 | 4/2004 | Kirby, III et al. |
| 6,786,487 B2 | 9/2004 | Dinc et al. |
| 6,935,634 B2 | 8/2005 | Zuo et al. |

(Continued)

FOREIGN PATENT DOCUMENTS

JP 2002-536613 10/2002

OTHER PUBLICATIONS

U.S. Appl. No. 12/408,236, filed Mar. 20, 2009.

(Continued)

*Primary Examiner* — Nathaniel Wiehe
*Assistant Examiner* — Ryan Ellis
(74) *Attorney, Agent, or Firm* — Nixon & Vanderhye, P.C.

(57) ABSTRACT

An active retractable seal assembly for use between rotating and non-rotating turbo machinery components including: a plurality of seal rings mounted to the non-rotating component, the seal rings movable toward and away from the rotating component between respective closed and open positions as a function of pressure drop across the seal rings, wherein the seal rings are normally in the open position; and a fluid bypass circuit for directing fluid around one or more of the plurality of seal rings to reduce the pressure drop across the one or more of the seal rings, thereby causing the one or more seal rings to move towards the open position under the action of spring(s) or actuator(s).

12 Claims, 6 Drawing Sheets

(56) References Cited

U.S. PATENT DOCUMENTS

| | | | |
|---|---|---|---|
| 6,957,945 B2 * | 10/2005 | Tong et al. | 415/1 |
| 7,293,953 B2 | 11/2007 | Leach et al. | |
| 7,384,235 B2 | 6/2008 | Adis | |
| 7,431,557 B2 | 10/2008 | Herron et al. | |
| 7,484,927 B2 | 2/2009 | Chevrette et al. | |
| 7,559,554 B2 * | 7/2009 | Hogg et al. | 277/412 |
| 2005/0206087 A1 | 9/2005 | Hogg et al. | |

OTHER PUBLICATIONS

Notice of Allowance issued in JP 2008-001829, dated Apr. 30, 2013.

* cited by examiner

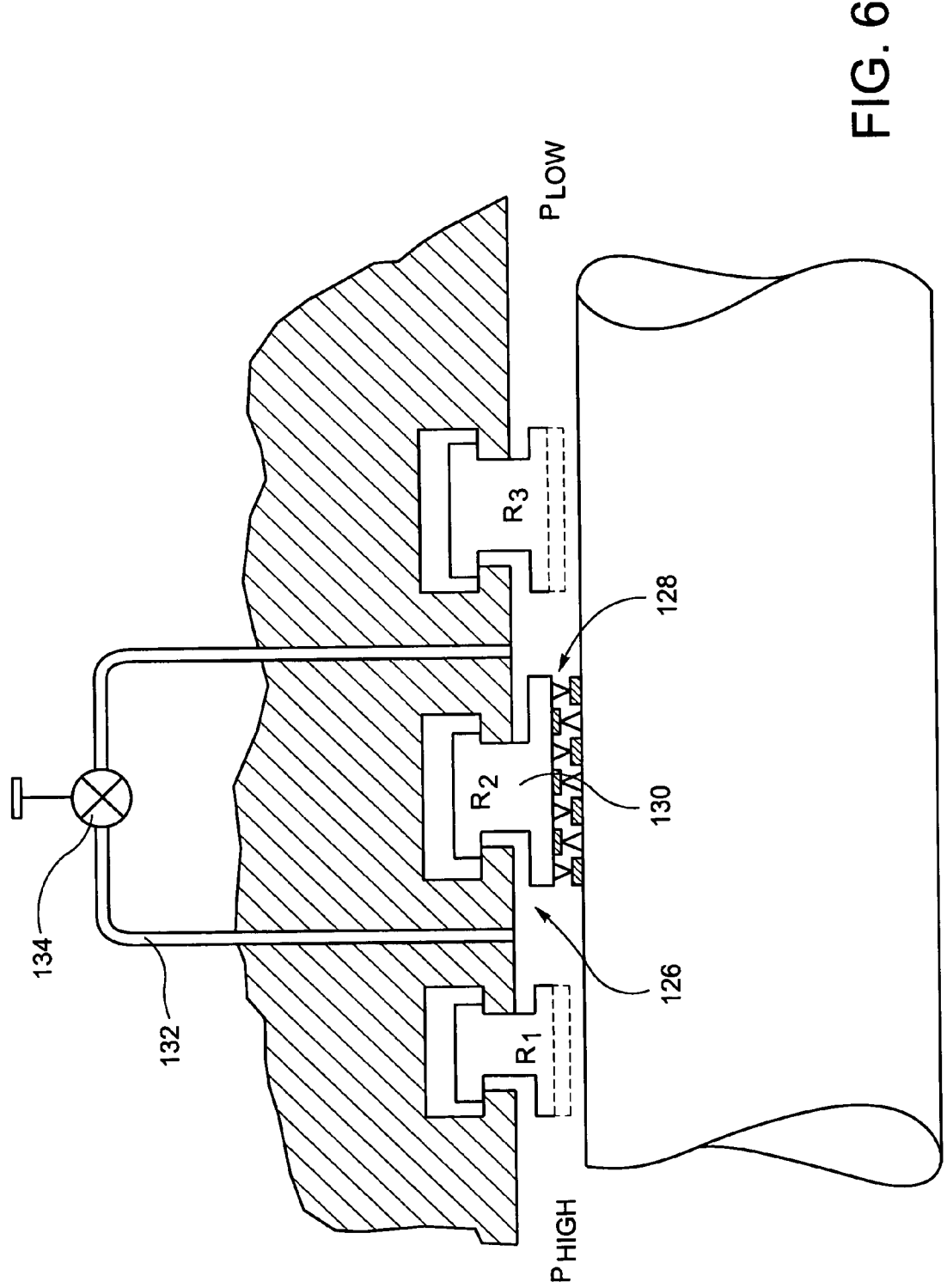

ACTIVE RETRACTABLE SEAL FOR TURBO MACHINERY AND RELATED METHOD

BACKGROUND OF THE INVENTION

The present invention relates to retractable seals for rotary machines such as steam turbines, gas turbines, aircraft engines, and compressors.

Rotary machines such as steam and gas turbines used for power generation and mechanical drive applications, aircraft engines used for propulsion, and compressors used for pressurization, are generally large machines consisting of multiple turbine and compressor stages. In such machines, pressurized fluid flowing through the turbine and/or compressor stages passes through a series of stationary and rotary components. In a typical steam turbine, the stationary components may include the machine casing and packing head, and the rotary component is the rotor. Annular seals mounted on the stationary components are used to control leakage of fluid along the path between the stationary and rotary components. In fact, the efficiency of the turbine is directly dependent on the ability of these seals to prevent such leakage. These seals can be radial or axial in orientation, and can be one of several kinds such as labyrinth packing seals, leaf seals, abradable seals, compliant plate seals, etc. Radial seals are often segmented for assembly reasons and/or for displacement in the radial direction. While radial segmented labyrinth seals have proved to be quite reliable in steam turbines, their performance degrades over time as a result of transient events in which the stationary and rotary components interfere, rubbing the labyrinth teeth into a "mushroom" profile and opening the seal clearance. On the other hand, near-contact seals such as brush seals and compliant plate seals can possibly contact the rotor during transient events leading to wear and heat generation. Heat generation, in turn, can cause rotordynamic instabilities, which are detrimental to the machine's operation and performance.

One means of reducing the negative effects of rubs or contact during transient events has been to employ the variable clearance "positive-pressure" (VCPP) arrangement, in which springs are used to hold the seal segments open at a large running clearance under the no- or low-flow transient conditions, when such rubbing is most likely to occur. During steady-state conditions, when the machine is typically operating at a higher load with higher fluid pressures, the ambient pressure around the seal segment overcomes the spring force acting to close the rings to a close running clearance. Examples of known variable clearance positive-pressure (VCPP) labyrinth seals may be found in U.S. Pat. Nos. 6,695,316; 6,022,027; 5,810,365; 5,603,510; 5,002,288; and 4,443,311.

However, the variable clearance positive-pressure arrangement employs segmented seals that respond solely to the machine load. Once the machine reaches a design load, the packing ring segments close and remain closed until the machine load, and therefore the fluid pressure inside the machine, drops adequately. Thermal transients may persist, however, even after the design load has been reached. Therefore, it is ideally desired that the seal segments remain open until the thermal transients subside. Furthermore, the VCPP seals are susceptible to rubbing in case of rotor vibrations during steady-state operation, when the seal segments are forced close by the ambient fluid pressure. In such circumstances, the current VCCP arrangement is not effective in avoiding rubs since it is a passive method for positioning the seal segments. It would be desirable to provide an "actively controlled" seal positioning arrangement in which the seal segments are held open not just during no- or low-flow conditions, which correspond to the start-up and shut-down transients, but can be opened at any other operating condition, when rubbing might occur, and for any desired period of time. During the operating conditions under which rubbing is unlikely, such as steady-state full or partial load machine operation in the absence of rotor vibration, it would be desirable to 'actively' move the segments radially inward to their close running clearance. This would enable optimal sealing between the stationary and rotary components during steady-state operation, sustained over the machine life.

So-called "Smart Seals" employ high force capacity pneumatic actuators to provide a radially outward force to "actively" open the seal segments under any machine operating condition. The need to preserve actuator life, however, requires pressure balancing that is achieved by means of pressure control systems. Also, the actuators must be externally pressurized to overcome the fluid ambient pressure, which necessitates an external high-pressure gas supply system. Examples of "Smart Seals" configurations may be found in U.S. Pat. Nos. 6,786,487; 6,655,696; 6,572,115 and 6,502,823.

BRIEF SUMMARY

In one non-limiting example, it is now proposed to provide an arrangement that allows seal segments to be retracted at any time during the operation of a turbo-machine by providing a flow bypass that neutralizes the pressure drop across the seal segments of interest. By eliminating or reducing this pressure drop, the radially inward force on the seal segments due to ambient fluid pressure is effectively reduced and the seal segments are then retracted open by springs or other suitable low-force capacity actuators. In this way, unlike the VCPP arrangement, the seal segments can be opened at any partial or full machine load, including the duration of start-up thermal transients when a design load has been reached.

Accordingly, in the exemplary and non-limiting embodiment, a pair of adjacent packing rings (each comprised of plural arcuate segments) among a group of, for example, six axially spaced rings, may be selected for active seal positioning via a bypass circuit. In other words, if it is desirable to actively retract packing rings $R_2$ and $R_3$, a shunt or bypass path is created for flow between a location upstream of $R_2$ (i.e., between rings $R_1$ and $R_2$) and a location downstream of $R_3$ (i.e., between rings $R_3$ and $R_4$). The shunt or bypass offers significantly less resistance to flow as compared to the leakage path between the seal rings and the turbine rotor. This ensures that the pressure drop across the chosen packing rings $R_2$ and $R_3$ will be significantly reduced when the shunt path is opened, even when the turbo-machine is operating at full load. Reduction of pressure drop across these two seal rings will allow them to retract or open due to the action of springs that are configured to nominally bias the packing segments in the open condition. Nominal, in this context, refers to the unloaded no- or low-flow machine condition.

It will be appreciated that opening and closing of the shunt path may be controlled by manual or automatic valve(s). The automatic valve(s) may be operated directly or in conjunction with the overall controller for the turbo-machine.

While the described embodiment relates to radially movable seals that are generally in the form of at least two arcuate segments, the invention described herein is equally applicable to closed, annular seals that move axially between open and closed positions as typically found in aircraft engines.

Accordingly, in one aspect, the invention relates to an active retractable seal assembly for use between rotating and non-rotating turbomachinery components comprising: at least one seal ring mounted to the non-rotating component, the seal ring movable toward and away from the rotating component between respective closed and open positions as a function of pressure drop across the seal ring; and a fluid bypass circuit for directing fluid around the at least one seal ring to reduce the pressure drop thereby resulting in the at least one seal ring moving towards an open position under the action of one or more springs or actuators.

In another aspect, the invention relates to a retractable seal assembly for use between a stationary turbine stator and a turbine rotor component of a turbine, the seal assembly comprising: a plurality of seal rings fixed to the turbine stator, each ring having at least two arcuate seal segments movable toward and away from the turbine rotor between respective closed and open positions as a function of pressure drop in a fluid flowing axially along the rotor; and a fluid bypass circuit for directing fluid around one or more of the plurality of seal rings to thereby reduce the pressure drop across the one or more of the seal rings thereby resulting in the seal segments of the one or more of the seal rings moving towards the open position under the action of one or more springs or actuators.

In another exemplary embodiment, there is provided a method of actively controlling at least one seal ring in a turbo-machine where the seal rings substantially surround a rotating component, the at least one seal ring moveable toward or away from a portion of the rotating component as a function of pressure drop of process fluid flowing along the rotating component, the method comprising: (a) establishing a fluid bypass circuit around the at least one seal ring; and (b) controlling the bypass circuit to selectively admit process fluid into the bypass circuit to thereby reduce the pressure drop across the at least one seal ring and resulting in the at least one seal ring moving away from the rotating component.

BRIEF DESCRIPTION OF THE DRAWINGS

FIG. 6 is a partial cross-section of a turbo-machine illustrating an active retractable radial abradable seal configuration in accordance with an exemplary embodiment of the invention.

DETAILED DESCRIPTION OF THE DRAWINGS

Figure 1:
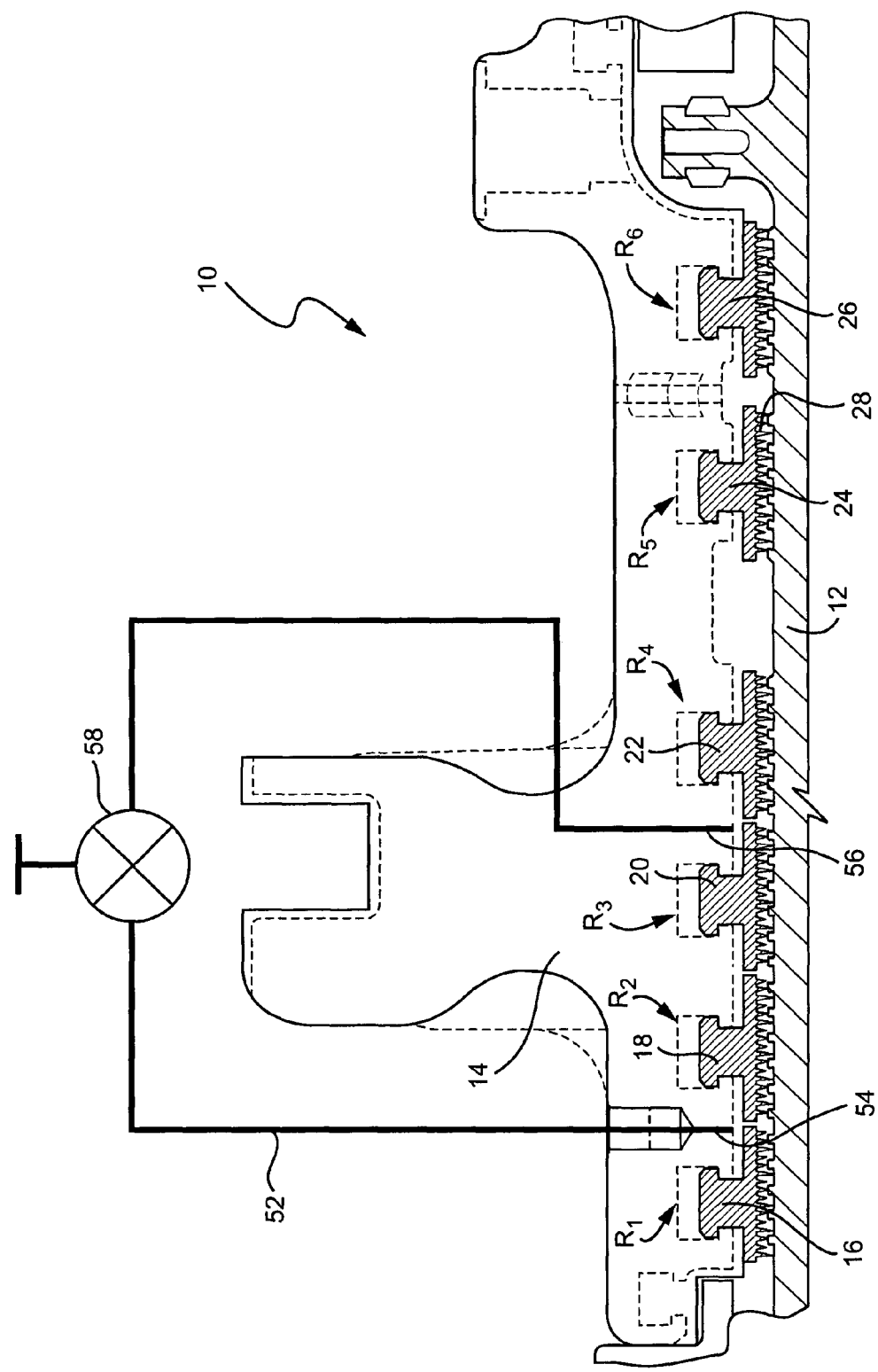
FIG. 1 is a partial cross-section of a turbo-machine illustrating an active retractable radial seal configuration in accordance with an exemplary embodiment of the invention.

With initial reference to FIG. 1, a turbo-machine seal assembly 10 is partially shown to include a rotor 12, and a casing or packing head 14. Plural labyrinth packing seal rings 16, 18, 20, 22, 24 and 26 (also labeled as rings $R_1$ through $R_6$) are shown mounted within the packing head at axially spaced locations along the rotor. Each seal ring is comprised of plural arcuate segments (at least two but typically four or more) that extend around the circumference of the rotor. When the seal rings are labyrinth seals, each seal segment includes a plurality of teeth 28 that are disposed in opposition to circumferential portions of the rotor 12 which may be alternately stepped up and down in radius. This invention is not limited, however, to any particular labyrinth tooth arrangement. In fact, the seal arrangement described herein is applicable to all kinds of seals, including but not limited to labyrinth packings (including straight tooth, slant tooth and Vernier packings), brush seals, compliant plate seals, shingle seals, honeycomb seals, and abradable seals. The seal arrangement is also applicable at any sealing location including but not limited to end packings (shown in FIG. 1), inter-stage sealing, tip sealing, etc., and is inclusive of annular, non-segmented axially movable seals.

Figure 2:
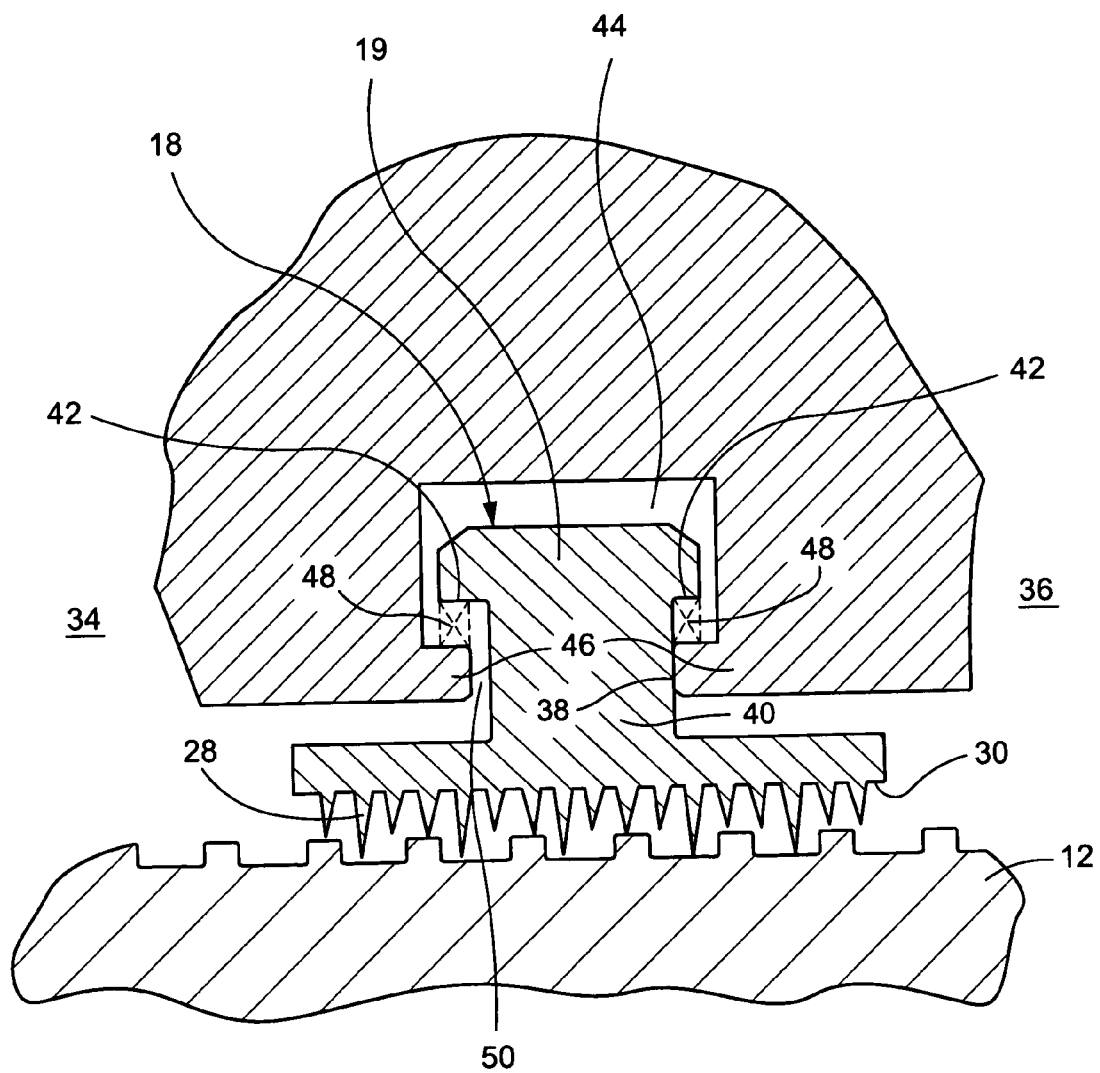
FIG. 2 is an enlarged cross-section through one of the seal rings taken from FIG. 1.

FIG. 2 is an enlarged cross-section of the seal ring 18, but in more detail. As indicated above, the seal ring 18 is formed by a plurality of segments 19, each having a sealing face 30, with the teeth or other seal elements 28 projecting radially inwardly therefrom. The high-pressure region 34 is separated from the low pressure region 36 at the interface 38, which is commonly referred to as the "seal joint", or more specifically "steam seal joint" in steam turbines. Typically, the seal segment functions by presenting a relatively large number of barriers (e.g., teeth 28) to the flow of fluid, between the seal segment 19 and the rotor, from the higher pressure region to the lower pressure region.

Typically, the seal segments have a necked-in center portion 40 with flanges 42 at the end opposite the sealing face 30. A packing head cavity 44 is shaped to include opposed hooks 46 received within the necked-in portion 40, thus mounting the seal segments for radially inward and outward movement, toward and away from the rotor 12. Springs 48 may be located between the hooks 46 and flanges 42 to nominally bias the seal ring segment to a radially retracted or open position. These springs hold the ring segments 19 in an open or retracted position during unloaded no- or low-flow conditions, such as startup or shutdown. As the turbine is brought up to operating load, the upstream high-pressure process fluid (e.g., steam or the gaseous products of combustion) enters the cavity 44 via gap 50 or other features, such as conventionally arranged feed holes, such that the pressure force overcomes the spring force, moving the seal segment 19 radially inwardly toward the rotor 12 to a close running clearance. This is a conventional VCPP arrangement well understood in the turbine art.

For explanation purposes only, the description below assumes a determination has been made to have the segmented ring seals 18 and 20 ($R_2$ and $R_3$) actively retractable under any operating conditions of the turbine. To this end, and with reference again to FIG. 1, a bypass or shunt circuit is provided that includes at least one conduit or pipe 52 extending from an inlet 54 at a location in the casing or packing head 14 upstream of seal ring 18 ($R_2$) to an outlet 56 at a casing or packing head location downstream of seal ring 20 ($R_3$). At least one bypass control valve 58 is located between the inlet 54 and outlet 56 for controlling flow through the bypass circuit. The valve 58 may be operated manually or automatically. Automatic operation can be either direct or in conjunction with the machine controller. When the valve 58 is opened, the bypass flow path offers significantly less resistance to flow as compared to the leakage between the seal rings and the rotor. This results in a significant reduction in pressure drop across the 'Active' seal rings 18, 20, which causes them to retract, i.e., open, under the influence of springs 48. The utilization of springs to open the seal ring segments is illustrative only, it being understood that suitable hydraulic, pneumatic or electromagnetic actuators could be employed.

The upstream position for a given seal ring represents all possible positions between the seal joints for this seal ring and the immediately upstream seal ring. Similarly, the downstream position for a given seal ring represents all possible positions between the seal joint for this seal ring and the immediately downstream seal ring.

It is important to note that the seal rings to be actively controlled may be chosen based on retrofitability requirements. Using the example of FIG. 1, the region immediately downstream of ring 16 ($R_1$) allows ample space for attaching the bypass piping 52, making all rings upstream of this location good candidates for active positioning. In general, one may choose to bypass, and thereby preserve the tooth integrity, of any number and combination of rings in a given end packing, against possible damage due to rubbing.

Figure 3:
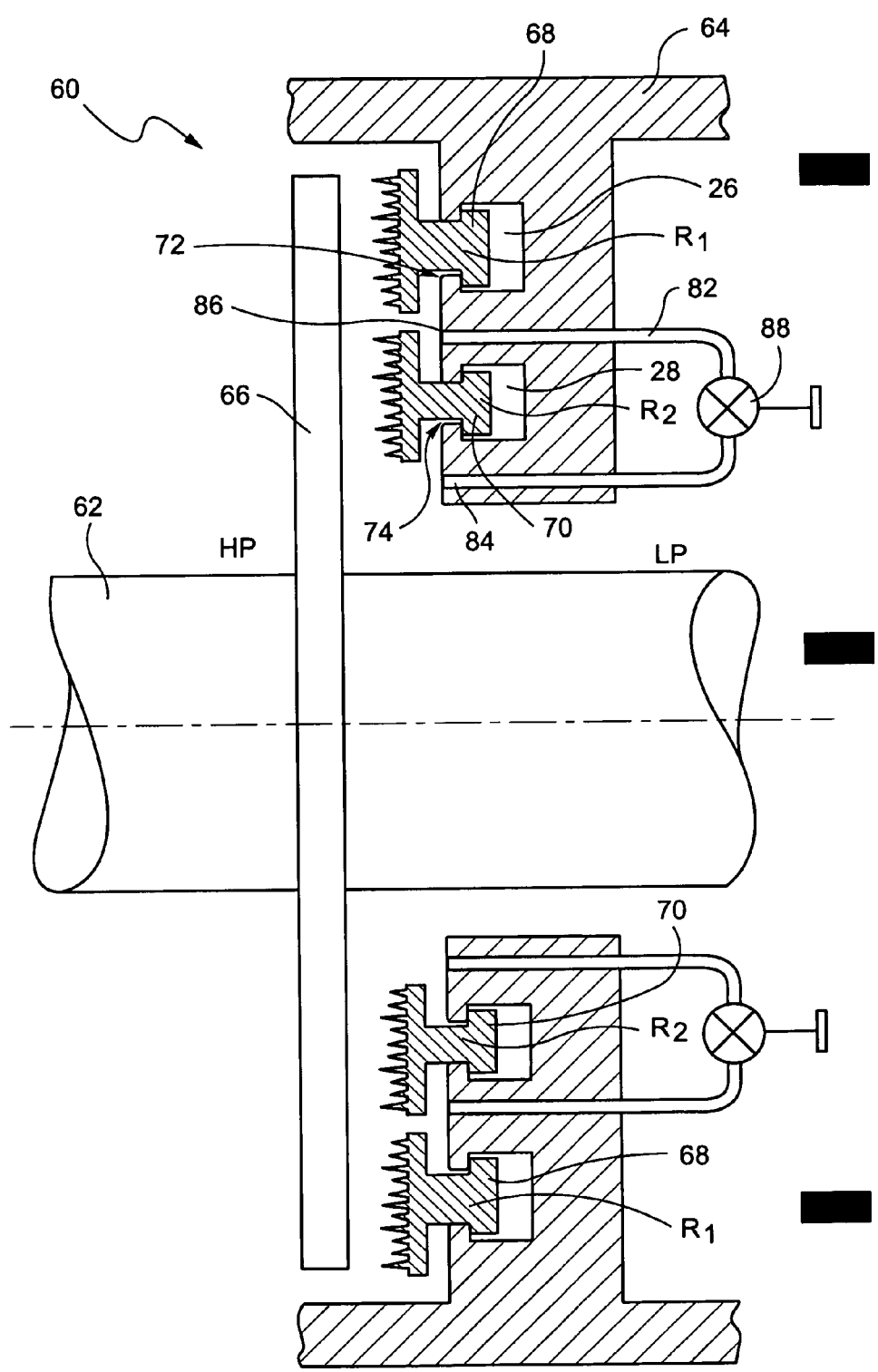
FIG. 3 is a partial cross-section of a partial cross-section of a turbo-machine illustrating an active retractable axial seal configuration in accordance with an exemplary embodiment of the invention.

Turning now to FIG. 3, an axial sealing arrangement 60 is illustrated. In this example, the rotor 62 is surrounded by a stator 64 that supports the seal assembly described below for cooperation with a rotor axial plate 66 mounted on the rotor 62 for the purpose of controlling leakage or fluid along the rotor 62 from the high pressure side to the low pressure side (indicated by "HP" and "LP" in FIG. 3) in a manner otherwise similar to the sealing arrangement described in connection with FIGS. 1 and 2.

In the illustrated embodiment, a pair of annular seal rings 68, 70 ($R_1$, $R_2$, respectively) are mounted within the stator 64 such that high pressure fluid may flow in the gaps 72, 74 and into the respective ring cavity 76, 78 to move the seal rings 68, 70 toward the rotor axial plate 66. As in the previously described embodiment, at least one of the seal rings (70 as illustrated in FIG. 3) may incorporate a bypass circuit that includes at least one pipe or conduit 82 extending from an inlet 84 at a location in the stator upstream of the seal ring 70 to an outlet 86 downstream of the seal 70, with at least one bypass control valve 88 located between the inlet and the outlet for controlling flow through the bypass circuit. As in the previously described embodiment, automatic operation can be either direct or in conjunction with the machine controller. When the valve 88 is opened, the bypass flowpath offers significantly less resistance to flow as compared to the leakage between the seal ring 68, 70 and the rotor axial plate 66, resulting in a significant reduction of pressure drop across the active seal ring(s), 70 in this case, causing it to retract or open under the influence of a spring or other suitable actuator as described hereinabove. Although a labyrinth packing seal is illustrated, it should be appreciated that this active retractable axial sealing arrangement is applicable to all kinds of seals, including but not limited to brush seals, compliant plate seals, shingle seals, honeycomb seals, and abradable seals.

Figure 4:
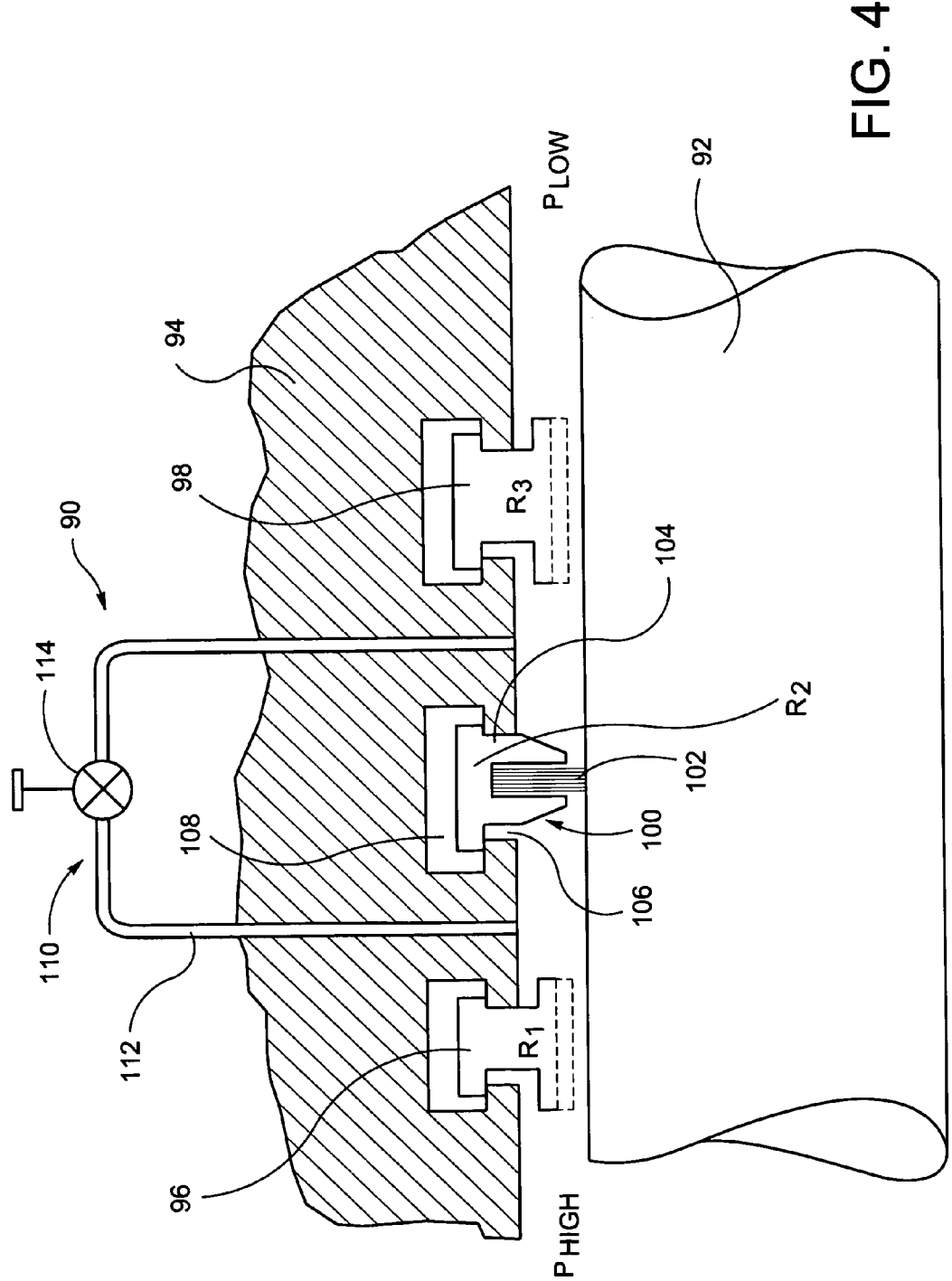
FIG. 4 is a partial cross-section of a turbo-machine illustrating an active retractable radial brush seal configuration in accordance with an exemplary embodiment of the invention.

Turning to FIG. 4, yet another embodiment of the invention is illustrated, incorporating an active retractable brush seal. More specifically, a brush seal assembly 90 surrounds a rotor 92, with annular seal segments supported in the stator 94. Seal ring segments 96 and 98 are part of annular seal ring assemblies $R_1$ and $R_3$ of the type utilized in FIGS. 1 and 2. The brush seal 100 utilizes a conventional brush seal elements 102 supported within a seal ring segment 104 forming part of the annular seal ring $R_2$. The brush seal 100 may be a stand-alone brush seal or may be incorporated within a traditional labyrinth packing seal for retrofitability reasons. The manner in which the brush seal moves between the open and closed positions is similar to the seal embodiments previously described, with high pressure flow entering the gap 106 and seal ring cavity 108 to move the seal ring $R_2$ to a closed position. As in the previously described embodiment, a bypass circuit 110 is employed utilizing at least one conduit 112 and associated valve 114, with the conduit extending from an upstream side of the seal ring $R_2$ to a downstream side of the seal ring. Otherwise, the active retractable brush seal 100 operates in the manner described above in connection with FIGS. 1-2. It should be noted, however, that seal rings $R_1$, $R_3$ may be passive seal rings (i.e., non-bypassed) and may be of any kind such as labyrinth seal, brush seal, compliant plate seal or abradable seal.

Figure 5:
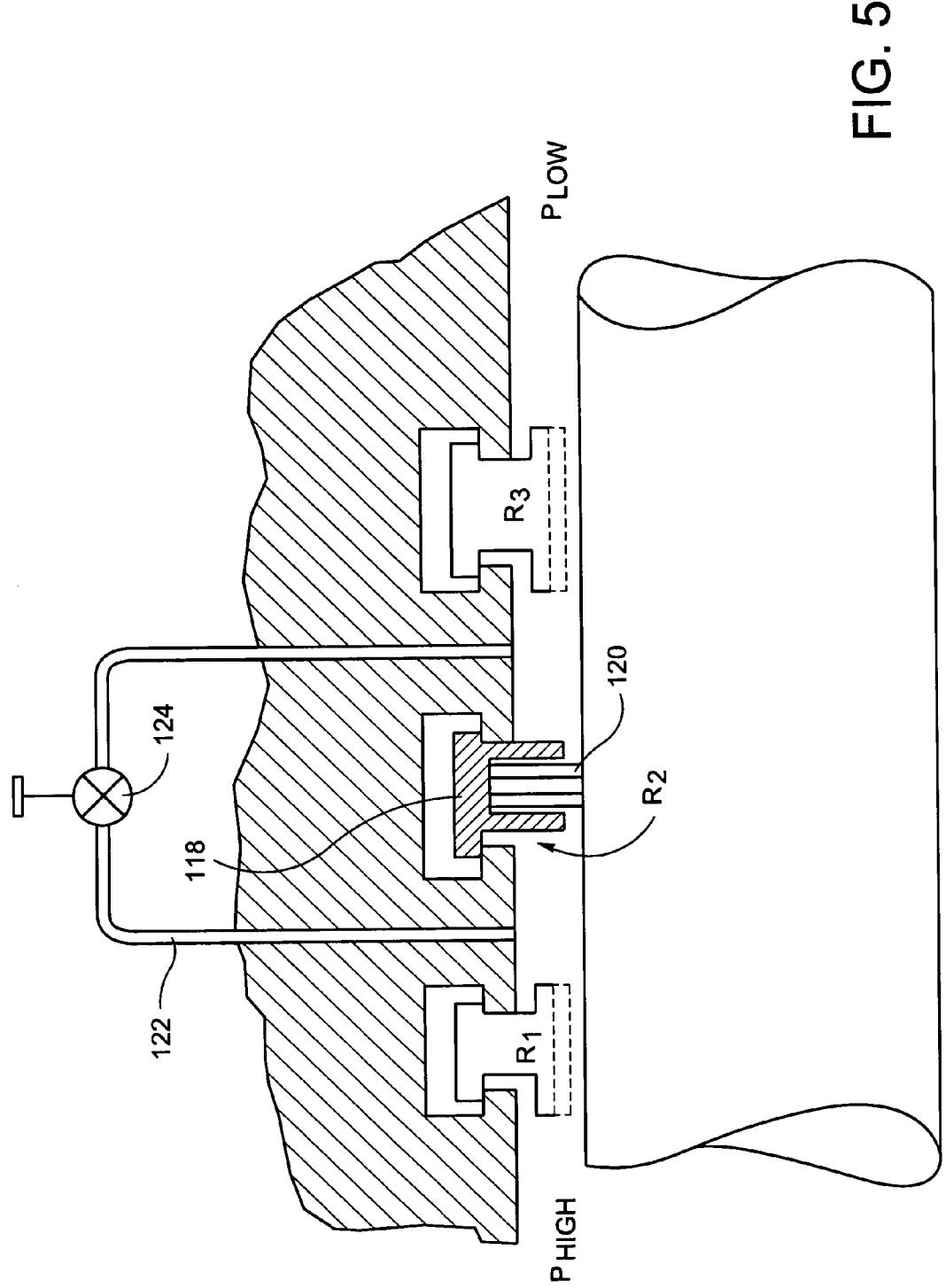
FIG. 5 is a partial cross-section of a turbo-machine illustrating an active retractable radial compliant plate seal configuration in accordance with an exemplary embodiment of the invention.

FIG. 5 illustrates another embodiment wherein the annular seal ring $R_2$ includes at least a pair of segments 118, each of which supports a compliant plate seal 120. The compliant plate seal 120 may be a stand-alone compliant plate seal or may be incorporated within a traditional labyrinth packing seal for retrofitability reasons. The bypass circuit includes the conduit 122 and valve 124 and this arrangement operates in the same manner as described hereinabove. Here again, however, the seal rings $R_1$ and $R_3$ on either side of the seal ring $R_2$ are non-bypassed seal rings and may incorporate labyrinth, brush, compliant plate or abradable seal assemblies.

In the embodiment illustrated in FIG. 6, active retractable abradable seal assembly 126 is illustrated wherein abradable coating or honeycomb type seal elements 128 are supported on a seal ring segment 130 of an annular seal ring $R_2$, with cutting teeth on the rotor. Alternatively, the abradable coating or honeycomb structure may be attached to the rotor and the cutting teeth may be part of the annual seal ring $R_2$. The seal ring $R_2$ is bypassed by a circuit that includes the conduit 132 and valve 134 as described with the previous embodiments. The non-bypassed annular seal rings $R_1$ and $R_3$ upstream and downstream of the annular seal ring $R_2$ may incorporate labyrinth, brush, compliant plate or abradable seal assemblies.

In the design of the bypass path, one may utilize multiple pipes emanating from different circumferential positions at the upstream of the active rings, manifolded to one bigger pipe equipped with a single valve. Beyond the valve, the bigger pipe may branch out to smaller multiple pipes that may be attached at different circumferential positions downstream of the active rings. Alternatively, multiple pipes with individual valves may be utilized, without the need for manifolding all pipes together. In still another alternative, and using FIG. 1 as an example, a single pipe 52 as shown may be used to implement the bypass. In general, the number and diameter of pipes will depend on flow requirements, space constraints, and ability to penetrate the stationary casing(s) and packing head.

At least one control valve 58 (also, FIG. 1) will be needed per bypass path, in case of multiple independent bypass paths. However, for reliable operation of the system, a redundant valve, in parallel or series to a main valve, may be incorporated in the design.

The active retractable seal concept works best when multiple seal stages or rings are present so that one set of seal ring(s) can be actively controlled while other upstream or downstream passive seal ring(s) that are unaffected by the bypass path or circuit perform the critical role of providing a certain minimum level of sealing (e.g., in end packings), or maintaining a certain minimum pressure drop (e.g., in blade tip sealing), when the active seals have been bypassed. While the sealing performance of the active seals is preserved, the sealing performance of the associated passive seals is allowed to be compromised by possible rubbing. For this reason, in interstage and bucket tip sealing configurations, it is desirable to include at least two sealing rings so that one can be made active by means of shunting while the other remains passive.

However, in general the concept is not limited to either single stage or multiple stage sealing, and can be applied to either case.

The use of active retractable seals has several benefits and advantage. For example, this idea enables the retraction of seal segments under any machine operating condition such as start-up, speed ramp-up, load ramp-up, forward-flow/reverse-flow, steady state operation, shut-down or trip.

The concept of reducing the closing force (radially inwards for a radial seal configuration), on packing segments may be used to open the seals using either a passive biasing method such as springs, or by means of actuators. If pursuing the latter option, the proposed concept significantly reduces the force capacity required of the actuators.

In addition to actively controlling the seal clearance and therefore leakage in a turbo-machine, this concept also allows an active cycling of the seal segments. For example the packing rings in a steam turbine may be cycled from open to closed and vice versa, essentially creating a "cleaning" mode for the retractable seals in units that have poor steam quality. As an example, in industrial steam turbines there are concerns that the retractable packing may not function with time due to deposits etc. from the steam. This cleaning mode adds reliability to the operation of active retractable seals.

As already noted, the bypass circuit to actively retract seal segments disclosed herein is applicable to all turbomachinery including but not limited to steam and gas turbines, compressors, and aircraft engines.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An active retractable seal assembly for use between rotating and non-rotating turbomachinery components comprising:
    at least one seal ring mounted to the non-rotating component, said at least one seal ring movable toward and away from the rotating component between respective closed and open positions as a function of pressure drop across the seal ring said at least one seal ring biased toward said open position by one or more actuators;
    a fluid bypass circuit for directing fluid around said at least one seal ring to reduce the pressure drop across the seal ring;
    wherein said fluid bypass circuit includes a conduit extending from an inlet at a location upstream of said at least one seal ring and terminating at an outlet location downstream of said at least one seal ring, and wherein a bypass control valve is located in said fluid bypass circuit, between said inlet and said outlet, said control valve enabling active control of pressure drop across the seal ring such that said at least one seal ring can be moved via said one or more actuators to said open position during operation and under any operating conditions of the turbomachinery.

2. The seal assembly of claim 1 wherein said bypass control valve is controlled manually.

3. The seal assembly of claim 1 wherein said bypass control valve is programmed for automatic operation.

4. The seal assembly of claim 1 wherein said rotating component comprises a rotor shaft.

5. The seal assembly of claim 1 wherein said stationary component comprises one of a shell, casing, packing head, diaphragm or shroud hanger.

6. The seal assembly of claim 1 wherein said one or more actuators comprises one or more springs.

7. The seal assembly of claim 1 wherein said at least one seal ring comprises at least two arcuate segments.

8. The seal assembly of claim 1 wherein said at least one seal ring comprises a plurality of seal rings and wherein said bypass circuit directs fluid around at least two of said plurality of seal rings.

9. A retractable seal assembly for use between a turbine stator and a turbine rotor component of a turbine, the seal assembly comprising:
    a plurality of seal rings mounted to said turbine stator, each ring having at least two arcuate seal segments movable toward and away from said turbine rotor between respective closed and open positions as a function of pressure drop in a fluid flowing axially along said rotor; and
    a fluid bypass circuit for directing fluid around one or more of said plurality of seal rings to thereby reduce the pressure drop across said one or more of said seal rings;
    wherein said fluid bypass circuit includes a conduit extending from an inlet at a location upstream of said at least one seal ring and terminating at an outlet location downstream of said at least one seal ring, and wherein a bypass control valve is located in said fluid bypass circuit, between said inlet and said outlet, said control valve enabling active control of pressure drop across said at least one seal ring such that said at least one seal ring can be moved via said one or more actuators_to said open position during operation and under any operating condition of the turbomachinery.

10. The retractable seal assembly of claim 9 wherein said bypass control valve is controlled manually.

11. The retractable seal assembly of claim 9 wherein said bypass valve is programmed for automatic operation.

12. The retractable seal assembly of claim 9 wherein said seal segments are biased toward said open position by at least two springs associated with each segment.

* * * * *